United States Patent

Trilling

[15] 3,638,132

[45] Jan. 25, 1972

[54] DIFFERENTIAL AMPLIFIER

[72] Inventor: Theodore R. Trilling, Berkshire Road, R.D.#3, Doylestown, Pa. 18901

[22] Filed: Apr. 10, 1968

[21] Appl. No.: 720,177

[52] U.S. Cl. ..............................................330/69, 330/30 D

[51] Int. Cl. ..........................................................H03f 1/00

[58] Field of Search....................................330/30 D, 69, 85

[56] References Cited

UNITED STATES PATENTS

| | | | |
|---|---|---|---|
| 3,036,274 | 5/1962 | Greatbatch | 330/15 |
| 3,182,269 | 5/1965 | Smith | 330/19 |
| 3,275,945 | 9/1966 | Walker et al. | 330/30 |

*Primary Examiner*—Nathan Kaufman

*Attorney*—G. J. Rubens and Henry Hansen

[57] ABSTRACT

A direct-coupled cascaded differential amplifier having a current isolation stage connected at the common mode point in the emitter circuit of the first differential pair and a differential mode current isolation device connected with either a double-ended or single-ended output circuit to couple negative series differential feedback to the emitter circuit of the first differential pair.

2 Claims, 5 Drawing Figures

INVENTOR.
THEODORE R. TRILLING

BY

ATTORNEY

INVENTOR
THEODORE R. TRILLING
BY
ATTORNEY

DIFFERENTIAL AMPLIFIER

The invention described herein may be manufactured and used by or for the Government of the United States of America for governmental purposes without the payment of any royalties thereon or therefor.

BACKGROUND OF THE INVENTION

In designing differential amplifiers, regardless of how well the individual characteristics and parameters of transistors or tubes may be matched for a particular operating point, unbalance may result from, for example, ambient temperature changes, aging of components and variations of the signal at the inputs. These variations may result in common mode voltage changes of such amplitude as to cause a differential amplifier to drift from its original operating point. This common mode change may cause the differential amplifier pair, or the output differential amplifier pair in a cascaded series, to swing beyond the linear region of operation, thus impairing the use of the device.

Accordingly, various techniques have been employed, singly or in combination, to compensate for such common mode shifts in operating point. Among these techniques are resistive compensation circuits and DC feedback circuits. Another technique for preventing shift of the operating point due to the common mode voltage involves rejection of the common mode input signal as by varying the electrical characteristics of an element in the common emitter (or common cathode) circuits of the input stage. In still another technique, the common mode feedback open loop gain may be maximized so as to raise the impedance of all the elements seen by the input stage common emitters. A typical circuit for providing this result may be found in U.S. Pat. No. 3,046,487. In the circuit therein described, the differential input impedance is raised by the application of series differential feedback to the emitters of the first differential pair. In the U.S. Pat. No. 3,262,006 by the present inventor, it is disclosed that if the common mode rejection ratio is first maximized by the use of a constant current generator in the emitter circuit of the first differential pair of a cascaded differential amplifier, the input impedance thereof is considerably improved. Such a circuit, however, requires utilizing some common mode feedback to control the generator and, as differential series feedback resistors would shunt the emitter circuit, feedback is applied not to the emitters but to the respective base or bases of the first differential pair. While this technique provides exceptional operating stability, the requisite output to base-input feedback becomes effective to lower the optimally desired high input impedance of the amplifier.

SUMMARY OF INVENTION

Accordingly, it is the general purpose of the present invention to provide both a current isolation stage at the common mode point in the first differential pair of a cascaded direct-coupled differential amplifier so as to maximize the common mode rejection ratio and further to provide a current isolation stage or device at the amplifier output to couple series differential feedback into the emitter (or cathode) circuit of the first differential pair. Such differential coupling results in a very high impedance current feed to the series emitter resistances with no loading of the emitter circuit and with all the attendant advantages and control afforded by closing the loop of the amplifier. Further, by utilizing this current isolation device as a differentially coupled pair, it becomes possible to obtain differential feedback for a single-ended output circuit.

DESCRIPTION OF THE PREFERRED EMBODIMENT

Figure 1:
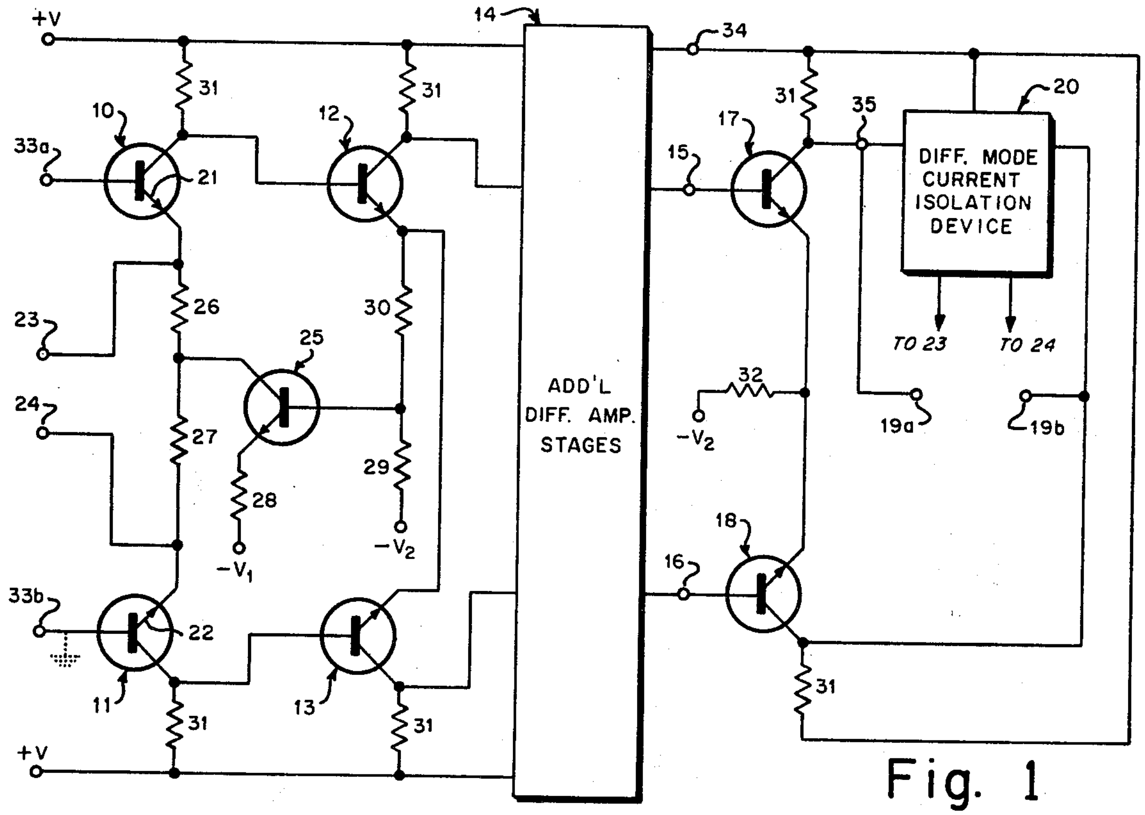
FIG. 1 is a schematic diagram of a direct-coupled cascaded differential amplifier showing the two current isolation devices in accordance with the invention.

Referring now to FIG. 1, there is shown a double-ended input-output amplifier comprising a plurality of direct-coupled differential amplifier stages. Amplifier devices 10 and 11 comprise the first or input differential amplifier pair. Input signals are applied at the points 33*a* and 33*b*, respectively. A second pair of differential amplifiers 12 and 13 are direct coupled, respectively, to the first amplifier pair 10 and 11. In the case of transistor amplifiers this coupling may be accomplished by connecting the respective collectors of the first amplifier pair to the respective bases of the second differential pair and in the case of vacuum tubes by connecting the respective plates of the first differential pair to the respective grids of the second differential pair. The outputs of the second differential pair are connected to a representative block 14 labeled "additional differential amplifier stages" which may comprise a plurality of differential amplifier pairs similar to the first and second differential pairs, these stages being omitted here for simplicity. The outputs of the last differential pair within block 14 are direct coupled at points 15 and 16 to the respective bases of the last output differential pair comprising transistors 17 and 18. This last output pair comprises a double-ended output circuit for the differential amplifier. The output signals from the transistors 17 and 18 are applied in parallel to the output terminals 19*a* and 19*b* and a differential mode current isolation device shown generally as 20 and described in detail hereinafter. In the textbook by Cote, A. J. Jr. and Oakes, J. B., *Linear Vacuum Tube and Transistor Circuits*, N.Y., McGraw-Hill, 1961, p. 148, a current isolation stage as defined as "one which provides a low input impedance and a high output impedance while preserving current gain." The device 20 provides differential negative feedback at points 23 and 24 to the respective emitters 21 and 22 of the first differential pair. Also connected to the emitters 21 and 22 is transistor 25, the output terminal or collector of which being connected at the common mode point of the first differential pair. More particularly, the collector of transistor 25 is connected to the emitter 21 through a resistor 26 and to the emitter 22 through a resistor 27. The emitter of transistor 25 is connected to a negative voltage, $-V_1$, through a resistor 28. Similarly, the base of transistor 25 is connected to a second negative voltage, $-V_2$, through a resistor 29. The base of transistor 25 is also connected to the emitter of transistor 12 through a resistor 30, this emitter additionally being directly connected to the emitter of transistor 13. Each individual transistor collector of each differential amplifier pair is connected to the positive terminal of a power source here indicated as +V through appropriate load resistors 31. In addition, the respective emitters of the double-ended output stage are connected to the negative voltage $-V_2$ by the emitter resistor 32.

The operation of the circuit of FIG. 1 will now be described. An ideal differential amplifier may be thought of as one in which there is no output signal if the two input signals are identical. An identical signal on both input terminals is known as a common mode signal. Moreover, any two arbitrary signals may be expressed in terms of a difference signal and a common mode signal while the gain of a differential amplifier may be expressed as a function of the gain derived from both the difference signal and the common mode signal. A figure of merit for the differential amplifier may then be ascertained by forming the ratio of the difference gain to the common mode gain. This is known as the common mode rejection ratio. Since the intended purpose of the differential amplifier is to provide an output signal which is proportional to the difference between the applied input signals, it can be seen that maximizing the common mode rejection ratio (as by minimizing the common mode gain) most closely approximates this desired result. Accordingly, the transistor 25 is provided in the emitter circuit of the differential pair 10 and 11 to raise the input impedance thereof by functioning as a current isolation device and thereby effectively cancelling the gain caused by the common mode signal. This can be seen from the following.

When a voltage $E_1$ having one amplitude is applied as an input to terminal **33*a* and a second voltage $E_2$ having a second amplitude is applied as an input to terminal 33*b* the difference $E_d$ between the two amplitudes is amplified in the known manner by the cascaded differential amplifier and appears across the output terminals 19*a* and 19*b*. As noted above, however, the composite amplifier gain may be considered to contain a common mode signal $E_c$ having a gain of $A_c$. Accordingly the output at points 19*a* and 19*b* may be affected by this common mode signal, common mode voltage causing the operating point of the first input differential pair (elements 10 and 11**) to change, this change in operating voltage being compounded by amplification as the signals proceed through the differential amplifier.

The common mode gain $A_c$ can be shown to be proportional to $1/R_k$, where $R_k$ is the resistance in the emitter circuit (or cathode circuit for tubes) of the first differential pair. Accordingly, maximizing $R_k$ minimizes $A_c$. To this end the transistor 25 is provided. Transistor 25 is connected at the common mode point of the first differential pair and functions as a current isolation device having a very high output impedance. This output impedance is the $R_k$ mentioned above. Thus the transistor 25 serves to minimize the common mode gain $A_c$ by providing a very high input impedance at the emitters 21 and 22. This high impedance further serves to prevent loading of the input stages. A more detailed explanation of a constant current source as means for minimizing the common mode gain is presented in the heretofore-mentioned U.S. Pat. No. 3,262,066. Accordingly, further discussion thereof is not here presented. It is to be noted, however, that for optimum performance $V_1$ must be more positive than or equal to $V_2$. That is, for proper biasing considerations, $V_2$ must be at least as negative as $V_1$.

While the circuit as thus far described provides satisfactory results, it is in many cases desirable to provide a feedback loop from output to input to achieve both closed loop control and minimization of differential parameter degradation and differential drift due to temperature or other variations. For example, if the gain A changes due to aging of the transistors or deterioration of the power supply, and this change is expressed as $dA/A$, then the change with feedback may be expressed as $[dA/A(1/1-\beta A)]$, where $A$ is the overall gain of the amplifier and $\beta$ is the percentage of the output current fed back to the input of the amplifier. Since $\beta A$ is very much greater than one, it is seen that the application of negative feedback reduces the change in gain by the factor $1/\beta A$, thereby greatly improving amplifier stability. In addition, since this feedback is taken at the differential amplifier output and as the output voltage may be considered to contain a common mode voltage $E_c$ and a difference voltage $E_d$ as discussed heretofore, it is possible to derive both common mode feedback and differential feedback with but a single feedback loop. How this is accomplished will be discussed hereinafter. The following discussion is directed toward negative differential feedback only.

For optimum performance it is desirable that the circuitry utilized to provide this feedback raises the input impedance as seen by looking into the input terminals of the first differential pair. Accordingly, a differential mode current isolation device 20 is provided which, because of its high impedance, permits the application of differential feedback directly to the emitter circuit of the first differential pair, thereby resulting in a higher input impedance and improved performance characteristics without affecting the operation of the common mode feedback circuit. The particularities of this circuit will be discussed more thoroughly hereinafter in regard to FIGS. 3–5, inclusive.

Figure 2:
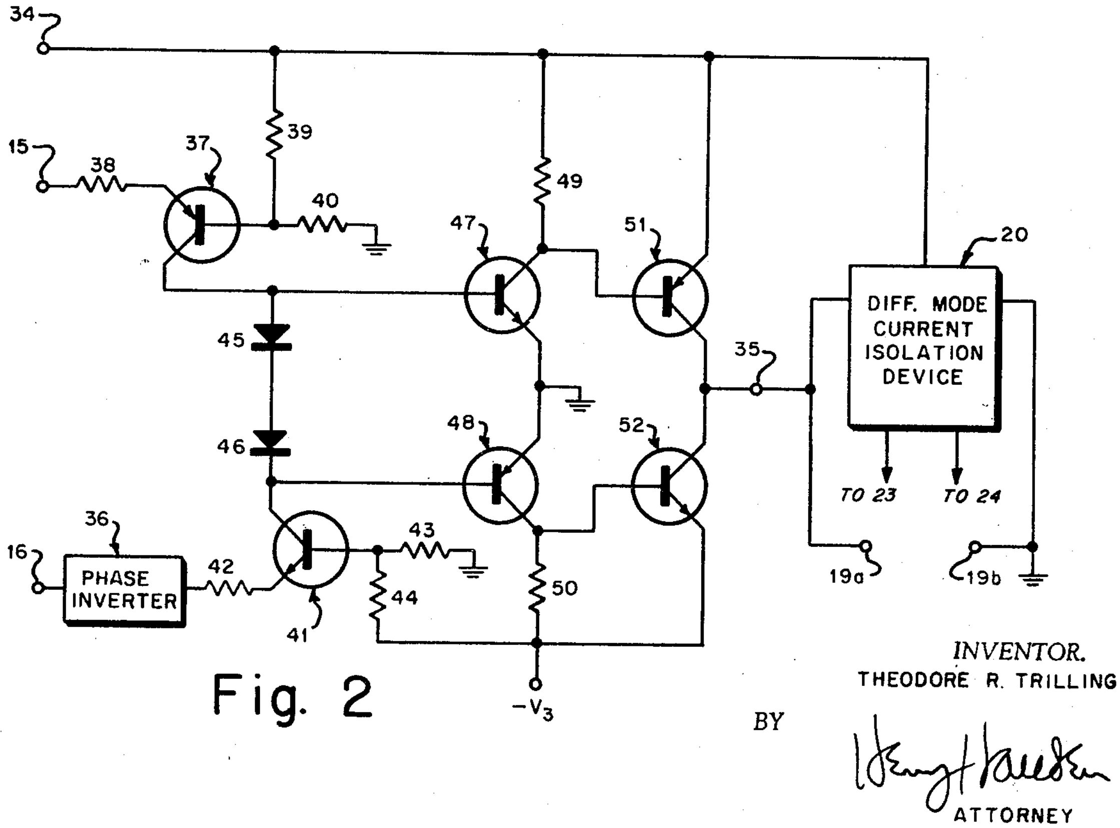
FIG. 2 is a schematic modification of the output stage of FIG. 1 showing an electrical circuit whereby a double-ended output signal may be converted to a single-ended output signal.

Referring now to FIG. 2, there is shown a double-ended input to single-ended output conversion circuit which includes a complementary class B amplifier. This circuit may be connected to the circuit of FIG. 1 at points 34, 15 and 16, respectively, in lieu of the double-ended output stage comprising transistors 18 and 17. The differential current mode isolation device 20 is connected substantially the same as in FIG. 1 except that one side thereof is grounded since it is receiving a single-ended input signal. The differential amplifier still operates in the same manner as disclosed with respect to FIG. 1. However, the conversion circuit permits the conversion of the double-ended output signal from element 14 to a single-ended output signal at point 35, which signal may then be applied to both the output terminal **19*a* and one side of the differential mode current isolation device 20. As noted heretofore, in this embodiment, one side of the differential isolation device and one of the output terminals (19*b***) are grounded.

In FIG. 2 there is shown a phase inverter 36 which may comprise an amplifier having a unity gain to thus provide 180° of phase shift. Aside from phase inverter 36, the double-ended input to single-ended output conversion circuit comprises six transistors. Transistor 37 has its emitter connected to receive an input signal at point 15 through a suitable resistor 38. The base is connected both to the the power source +V at 34 through a resistor 39 and to ground through a resistor 40. The transistor 41 is connected to receive an input signal at 16 through phase inverter 36 and resistor 42. The base of transistor 41 is connected to ground through a resistor 43 and to a negative voltage source $-V_3$ through a resistor 44. The collectors of both transistor 37 and transistor 41 are connected to diodes 45 and 46, the diodes being connected in series with the anode of diode 45 connected to the collector of transistor 37 and the cathode of diode 46 being connected to the collector of transistor 41. The respective collectors of each of these transistors are also connected to the respective bases of complementary symmetry transistors 47 and 48. The emitters of transistors 47 and 48 are commonly grounded or may be tied to point 35 through a resistor (not shown) for feedback purposes while the collectors of the transistors are connected respectively to the power source +V through a resistor 49 and the power source $-V_3$ through a resistor 50. The respective collectors of each of these transistors are also direct coupled to the respective bases of compoundly connected transistors 51 and 52. The output signal from transistors 51 and 52 is taken from their commonly tied collectors at point 35. The emitter of transistor 51 is directly connected to the positive voltage +V while the emitter of transistor 52 is directly connected to the negative voltage $-V_3$. It is to be noted further that both transistors 37 and 41 are biased as current isolation devices and accordingly exhibit high output impedances. The purpose of this is to prevent base distortion at transistors 47 and 48. In addition, the diodes 45 and 46 are utilized to compensate for the base to emitter drop inherently present in transistors 47 and 48.

The operation of this circuit will bow be described. Because the signals at points 15 and 16 are differential, they are 180° out of phase relative to one another. The phase inverter 36 is provided to invert the phase of one of the signals by 180°. It is of course understood that phase inverter 36 could be employed in the emitter circuit of either transistor 37 or transistor 41. Thus the signals at the respective emitters of transistors 37 and 41 are of the same phase. Accordingly, as the signal at the emitter of transistor 37 rises, the signal at the emitter of transistor 41 rises. In addition, as both the transistors 37 and 41 are connected in the common base configuration they both function as high-impedance feeds to the bases of the transistors 47 and 48 and cause the signals appearing at the respective collectors of transistors 37 and 41 to follow the signals applied to their respective emitters. Accordingly, the signal at the collector of transistor 37 rises with the input signal applied to the emitter thereof and, similarly, the collector signal of transistor 41 rises in like manner as the signal applied to its emitter.

These signals are now in-phase single-ended signals and are applied to the respective bases of complementary class B push-pull transistors 47 and 48. Transistors 47 and 48 are of opposite polarity and are biased both at their respective collectors to voltage sources of opposite polarity and at their respective bases by diodes 45 and 46 which shift the operating point of both transistors to zero. Accordingly, the amplified output signals at the collectors are out of phase by 180°, one of the signals being representative of the positive half of the input signal and the other of the signals being representative of the negative half of the input signal. These signals are then applied to the respective bases of a second complementary class B push-pull pair comprising transistors 51 and 52 where they are further amplified. Since the collectors of transistors 51 and 52 are tied together, a single-ended output signal is taken therefrom at point 35. This signal is fed to the output terminal 19*a* and one side of the differential mode current isolation device 20, point 19*b* being grounded. Device 20 then provides differential current isolation feedback to the emitters 21 and 22 at points 23 and 24. Since the differential feedback thus developed is derived from a single-ended output stage, all of the advantages of utilizing the differential characteristics of the input stages are achieved as well as the advantage of total closed loop control from output to input.

For optimum performance of the circuit of FIG. 2 it in many cases becomes desirable to balance the circuit such that (optimally) zero or minimum output is present at the point 35 upon either grounding or applying equal input signals at points 15 and 16. This may be achieved by adjusting the voltage at the base of transistor 41, as by providing a potentiometer (not shown) in lieu of resistors 43 and 44.

The circuits of FIGS. 3–5, inclusive, will now be described. The differential mode current isolation device 20 may comprise any of a plurality of active devices which display high output impedance and good common mode cancellation. Embodiments of such circuits are shown in FIGS. 3–5, inclusive, as devices 20*a*, 20*b*, and 20*c*, respectively.

Figure 3:
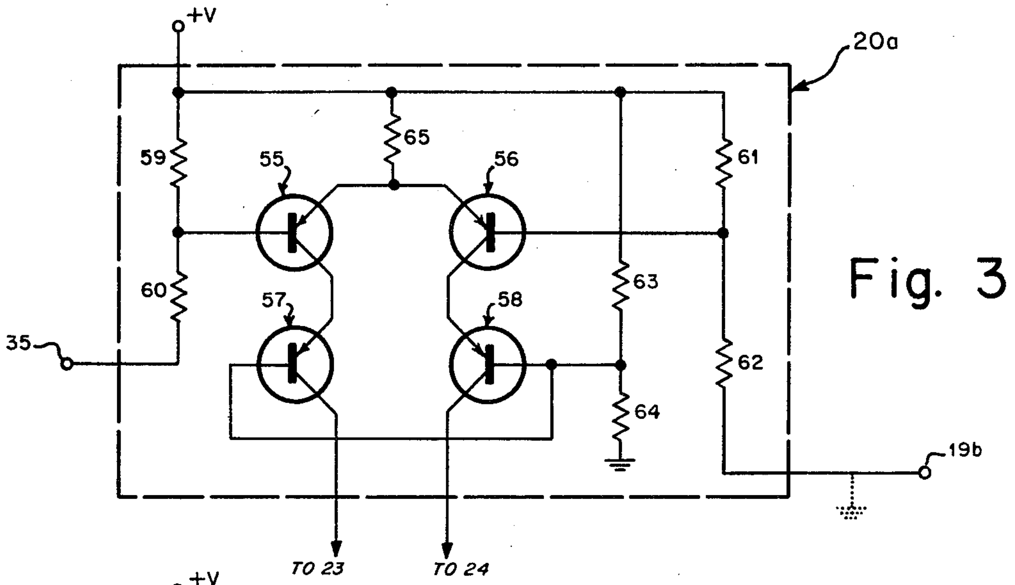
FIG. 3 is a schematic diagram of a particular current isolation device utilized in FIGS. 1 and 2.

In FIG. 3 is shown a differential common emitter stage comprising transistors 55 and 56 driving a common base load comprising, respectively, transistors 57 and 58. The base of transistor 55 is connected to the positive voltage source +V through a resistor 59 and also to the output terminal 35 through a resistor 60. The base of transistor 56 is connected to the positive voltage +V through a resistor 61 and is connected through a resistor 62 to the output terminal 19*b* which may or may not be grounded, depending upon whether or not the signal from the last output transistor pair is of the double-ended type, as in FIG. 1, or the single-ended type, as in FIG. 2. Biasing for the common base load transistors 57 and 58 is derived from a single voltage divider network comprising resistors 63 and 64. Thus the base of transistor 57 is tied directly to the base of transistor 58, positive voltage being developed across the resistors 63 and 64 from voltage source +V. It is noted that for proper biasing, the voltage drop across resistor 64 should be less than the voltage drop across resistor 62. Transistors 55 and 56 have their emitters tied to the positive voltage +V by a common resistor 65. The differential output from the circuit is taken from the respective collectors of transistors 57 and 58 and is fed back to the terminals 23 and 24 connected to the respective emitters 21 and 22 of transistors 10 and 11.

The operation of this circuit is as follows. Upon the receipt of a signal either at points 35 and 19*b* or at point 35 alone (depending upon whether the received signal is double or single-ended, as discussed heretofore) the differential pair 55–56 provide a differential output signal to the emitters of common base transistors 57 and 58. Since common base transistors have very high output impedances the differential signals received by the emitters of transistors 57 and 58 are reflected into their respective collectors and fed back as a very high-impedance current feed to points 23 and 24 with no loading of either an externally applied load or the emitter circuits of the first differential pair.

Figure 4:
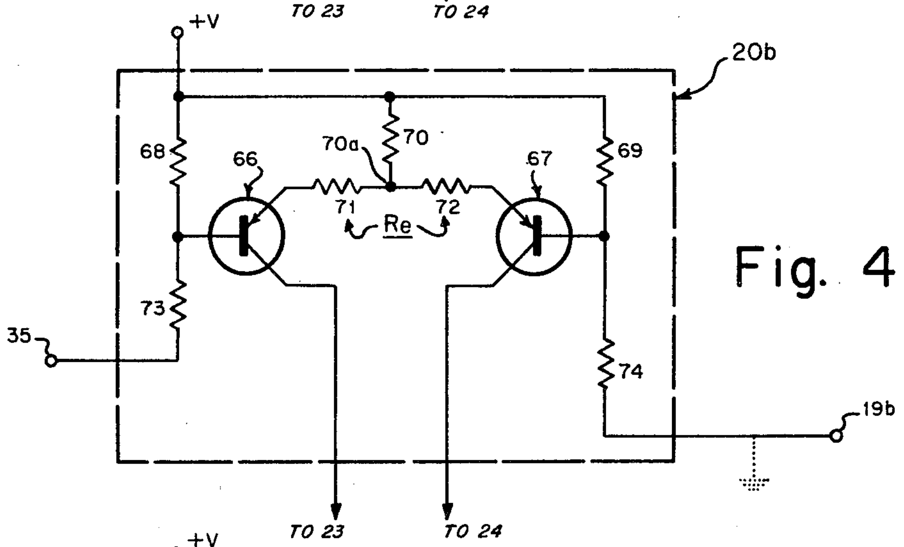
FIG. 4 is a schematic diagram of an alternative current isolation device utilized in FIGS. 1 and 2.
Figure 5:
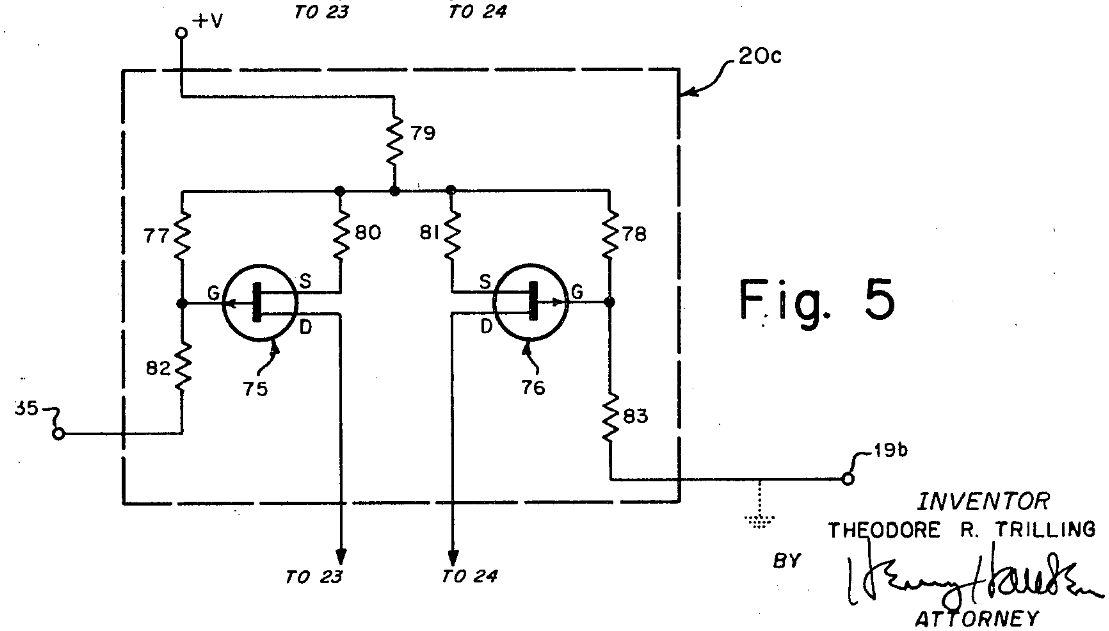
FIG. 5 is yet another alternative current isolation device utilized in FIGS. 1 and 2.

The circuit of FIG. 4 is similar to the circuit of FIG. 3 in that it comprises a differential pair of transistors 66 and 67 connected to provide a high-impedance differential feedback current to the terminals 23 and 24. As in FIG. 3 the input signal is taken at point 35 while point 19*b* may either receive an input signal or be grounded. Biasing resistors 68 and 69 are connected to the positive voltage +V and the respective bases of transistors 66 and 67. Also connected to these bases are, respectively, resistors 73 and 74. Connected to the respective emitters of transistors 66 and 67 are resistors 71 and 72, these resistors being tied together at point 70*a* and connected to the positive voltage +V through a resistor 70.

The basic difference between the circuits of FIG. 3 and FIG. 4 is that in FIG. 4 the transistors provide little gain as, although transistors 66 and 67 are connected in an emitter-coupled configuration, they are biased as though they were connected in the common base mode. Thus the parallel impedance of resistors 68 and 73 in series with the input base impedance of transistor 66 and the parallel impedance of resistors 69 and 74 in series with the input base impedance of transistor 67 should each be less than or equal to the combined impedance of the common emitter resistance $R_e$, here shown as resistors 71 and 72.

In operation, and upon the receipt of an input signal, the differential pair 66–67 provide a high-impedance differential current feed to points 23 and 24, due to the above-mentioned common base bias, in the manner analogous to the circuit of FIG. 3.

The circuit of FIG. 5 is a field effect version of the circuit of FIG. 4 and is very similar thereto. The circuit comprises field effect transistors 75 and 76 each of which has a source (S), drain (D), and gate (G). The gates of the transistors 75 and 76 are connected respectively through resistors 77 and 78 to a common resistance 79 which in turn is connected to the positive voltage supply +V. Also connected to the resistor 79 are two source resistors 80 and 81. Biasing of the network is completed by the resistors 82 and 83 connected to the respective gates of transistors 75 and 76. As in FIGS. 3 and 4 the input to the circuit of FIG. 5 is taken at point 35 as well as at point 19*b*, depending upon whether or not a double-ended or single-ended input signal is being utilized. The field effect transistors are source coupled through resistor 79. Because of the current saturation characteristics of field effect devices, the output impedances of transistors 75 and 76 are very high. Accordingly, upon the receipt of an input signal, a high-impedance differential current is fed back to points 23 and 24 with no loading of either an externally applied load or the input emitter impedance of the first differential pair.

Obviously, many modifications and variations of the present invention are possible in light of the above teachings. For example, if a single-ended input double-ended output amplifier were desired it is necessary only to ground terminal 33*b* (as shown in dashed outline) and provide a signal only to terminal 33*a*. In addition, as noted heretofore, common mode feedback as well as differential feedback can be obtained from the single current isolation device 20. Thus in the double-ended output case of FIG. 1, this could be accomplished by eliminating transistor 25, resistors 28–30, inclusive, and voltage sources $-V_1$ and $-V_2$ and by connecting together each through suitable feedback resistor the emitter of transistor 10 with the emitter of transistor 12 and the emitter of transistor 11 with the emitter of transistor 13. Feedback would still be applied to points 23 and 24 as heretofore discussed.

What is claimed is:

1. Differential amplifier apparatus comprising:

a first plurality of cascaded stages;

a second plurality of cascaded stages;

each stage of said first and second plurality including a transistor with an emitter, collector and base;

said first and second plurality of cascaded stages formed by operatively connecting the collector of one stage to the base of the following stage;

first impedance means connected at one end thereof to said emitter of the first stage of said first plurality of cascaded stages;

second impedance means connected at one end thereof to said emitter of the first stage of said second plurality of cascaded stages;

said first and second impedance means joined together at their respective other ends to form a common connection;

bias means operatively connected to selected transistor electrodes for providing bias signals thereto; and circuit means for providing current-isolated feedback signals having a pair of input leads respectively connected to said collectors of the last stage of said first and second plurality of cascaded stages and a pair of output leads respectively connected to said first stage emitters, said circuit means further including a pair of differentially connected active elements each having an input respectively connected to said circuit means input leads and an output operatively connected respectively to said circuit means output leads.

2. Differential amplifier apparatus comprising:

a first plurality of cascaded connected transistors having the base of the first cascaded transistor and the collector of the last cascaded transistor forming first input and first output terminals respectively, and the remaining collectors of each cascaded transistor being connected to the base of the next cascaded transistor;

a second plurality of cascaded connected transistors, corresponding to said first plurality, having the base of the first cascaded transistor and the collector of the last cascaded transistor forming second input and second output terminals respectively, and the remaining collectors of each cascaded transistor being connected to the base of the next cascaded transistor;

first and second impedance connected in series between the respective emitters of the first cascaded transistors, the emitters of the remaining corresponding cascaded transistors being directly coupled to each other;

first bias means including a first voltage source operatively connected to the collector of each of said cascaded transistors;

second bias means including a bias transistor, and a second voltage source operatively connected to the emitter of said bias transistor, the collector of said bias transistor being connected to the junction of said first and second impedances;

third bias means including a third voltage source operatively connected to the emitters of said remaining cascaded transistors and to the base of said bias transistor;

a differential mode current-isolation feedback network including a pair of differential feedback transistors, third and fourth series-connected impedances connected between the emitters of said differential transistors, said first voltage source being operatively connected to the junction of said third and fourth impedances and to the bases of said feedback transistors and the bases of said differential transistors being connected to the first and second output terminals, and the collectors of said transistors being respectively connected to the emitters of the first cascaded transistors.

* * * * *